United States Patent
Nagai (10) Patent No.: US 8,928,943 B2
(45) Date of Patent: Jan. 6, 2015

(54) IMAGE PROCESSING APPARATUS AND IMAGE PROCESSING METHOD

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 12/706,317

(22) Filed: Feb. 16, 2010

(65) Prior Publication Data

US 2010/0231936 A1  Sep. 16, 2010

(30) Foreign Application Priority Data

Mar. 10, 2009  (JP) .................................. 2009-057129

(51) Int. Cl.
*H04N 1/60* (2006.01)
(52) U.S. Cl.
CPC .................................. *H04N 1/6033* (2013.01)
USPC ............................. 358/2.1; 358/504; 358/527
(58) Field of Classification Search
USPC ........... 358/1.9, 2.1, 500, 504, 527, 515–518, 358/530, 400, 406
See application file for complete search history.

(56) References Cited

U.S. PATENT DOCUMENTS

| | | | |
|---|---|---|---|
| 5,963,756 A | 10/1999 | Sakai et al. | |
| 6,418,281 B1 | 7/2002 | Ohki | |
| 6,697,167 B1 | 2/2004 | Takahashi | 358/1.9 |
| 7,130,082 B2 | 10/2006 | Takahashi | 358/2.1 |
| 7,154,634 B2 | 12/2006 | Hung | 358/1.9 |
| 7,230,739 B2 | 6/2007 | Takahashi | 358/2.1 |
| 2009/0086227 A1 | 4/2009 | Nagai | |

FOREIGN PATENT DOCUMENTS

| | | |
|---|---|---|
| JP | 62-296669 | 12/1987 |
| JP | 07-288703 | 10/1995 |
| JP | 10-193689 | 7/1998 |
| JP | 2000-059643 | 2/2000 |
| JP | 2000-238341 | 9/2000 |
| JP | 2002-354278 | 12/2002 |
| JP | 2005-153165 | 6/2005 |

*Primary Examiner* — Thomas D Lee
*Assistant Examiner* — Stephen M Brinich
(74) *Attorney, Agent, or Firm* — Fitzpatrick, Cella, Harper & Scinto (57) ABSTRACT

An image processing apparatus includes a designating unit that designates a color to be output in a target color, an analyzing unit that extracts, with regard to input image data, coordinates of a location to be output in the designated target color, and page information that specifies a page that includes the coordinates, a colorimetry unit that measures a color of an image that is on a page prior to a page with respect to which the color to be output in the target color was designated, and that was obtained by forming an image based on data including the designated color, a generating unit that generates correction data for approximating a color resulting from the colorimetry to the target color, and a correcting unit that corrects color data of the location in the targeted page to be output in the target color.

10 Claims, 12 Drawing Sheets

| | 701 PRINT JOB | 702 REFERENCE | 703 MEASUREMENT | 704 POSITION |
|---|---|---|---|---|
| 1 | DESIGNATED COLOR PRESENT | × | ○ | Start X : ☐ Y : ☐<br>End X : ☐ Y : ☐ |
| 2 | DESIGNATED COLOR ABSENT | - | - | - |
| 3 | DESIGNATED COLOR ABSENT | - | - | - |
| 4 | DESIGNATED COLOR PRESENT | Page 1 | × | Start X : ☐ Y : ☐<br>End X : ☐ Y : ☐ |
| 5 | DESIGNATED COLOR PRESENT | Page 1 | × | Start X : ☐ Y : ☐<br>End X : ☐ Y : ☐ |

IMAGE PROCESSING APPARATUS AND IMAGE PROCESSING METHOD

BACKGROUND OF THE INVENTION

1. Field of the Invention

The present invention relates to an image processing apparatus that receives image data and performs a printing process and to an image processing method, and more particularly to an image processing apparatus provided with calibration control for stabilizing the coloration of a printed image and to an image processing method.

2. Description of the Related Art

In recent years, there has been increasing demand for direct imaging printers that do not require a plate used in offset printing and the like. Direct imaging printers are widely used because of the desire to shorten the printing time and to print a large number of copies, and because of environmental issues such as the disposal of paper arising from printing failures. Of these, inkjet printers that are cost effective and suitable for printing photos and electrophotographic printers that have high productivity and a finish approaching that of offset prints are most widely used. In such a context, the color stability of images formed on paper is one of the most important functions required of direct image printers as an alternative to conventional offset prints and photographs.

Techniques relating to color stability control have been previously proposed, in order to secure color stability. As one example of color stability control in an electrophotographic image processing apparatus, firstly a patch pattern obtained by performing halftone processing at a prescribed density level on a plurality of points are formed in the apparatus on an intermediate transfer member as a toner image, and, similarly, the densities of these patches are measured using a sensor provided in the apparatus. Next, the density characteristics of the halftone processing with respective to input density levels are computed based on these measurement results, and a density correction table is generated such that the input density levels in the print data will be prescribed standard density values. Subsequently, the input density levels of the print data are corrected using this density correction table. The density and coloration of print output can thereby be constantly maintained in a fixed range according to the input density levels (e.g., see Japanese Patent Laid-Open No. 2000-238341).

However, density measurement based on toner images on an intermediate transfer member is only able to obtain density information prior to toner images being fixed on paper, even though forming and erasing toner images is simple. For this reason, in the case where density control based on toner images is performed, the effect of the fixing process and processes downstream thereof cannot be reflected in the density control. In view of this, a method has been proposed whereby, in a copier, an image on output paper obtained by forming an image with a copier body (printer unit) is read using a reader unit set up in the printer unit, and image control is performed based on the read result, for example (e.g., see Japanese Patent Laid-Open No. 62-296669). However, with this method, the operations are troublesome, since the user must remove the output paper that has undergone image forming by the printer unit from a paper discharge unit, set output paper in the reader unit, and configure the image reading settings. For this reason, image control cannot be executed frequently, making it difficult to sufficiently stabilize image quality with respect to image characteristics of the image processing apparatus that are constantly changing. Techniques that involve setting up an optical sensor on a conveyance path downstream of a fixer for fixing a toner image on paper and detecting output images formed on paper have been proposed in order to solve the problems referred to above (e.g., see Japanese Patent Laid-Open No. 10-193689). However, in the case where sensors are installed on the conveyance path downstream of the fixer, disposing the sensors to span the entire area in a direction perpendicular to the conveyance direction is difficult in terms of cost and space, and realistically 1 to 4 sensors are disposed in most cases. For this reason, in the case where it is desired to detect a number of patches equivalent to control for reading an image with the above-mentioned reader unit, a patch pattern that is long in the conveyance direction needs to be formed, but if such a patch pattern is used, the detection time and the number of output sheets increase dramatically. Accordingly, the number of patches needs to be limited in the case where sensors are set up on the conveyance path, but when color stability control is performed on an output image with a small number of patches, achieving color stability with high accuracy with respect to all of the colors output by the printer is difficult.

Also, with the electrophotographic method, image reproducibility is constantly changing, since the output state fluctuates during the printing process due to various factors. Accordingly, even if the correction process is performed immediately before the printing process on image data, in cases such as where the number of pages of the image data to be printed is very large, the processing time needed for printing will be lengthened, and the output characteristics will fluctuate greatly. As a result, the coloration of specific colors may vary during the printing process on the same image data.

SUMMARY OF THE INVENTION

The present invention provides an image processing apparatus and an image processing method capable of securing color reproduction accuracy of specific colors, despite fluctuations in the output characteristics in an image output apparatus that uses an electrophotographic method.

According to one aspect of the present invention, there is provided an image processing apparatus comprising: an input unit configured to input a plurality of pages worth of image data; a designating unit configured to designate a color to be output in a target color; an analyzing unit configured to extract, with regard to the image data input by the input unit, coordinates of a location to be output in the target color designated by the designating unit, and page information that specifies a page that includes the coordinates; a colorimetry unit configured to measure a color of an image that is on a page prior to a page with respect to which the color to be output in the target color was designated, and that was obtained by forming an image based on data including the color designated by the designating unit; a correction data generating unit configured to generate correction data for approximating a color resulting from the colorimetry to the target color; and a correcting unit configured to correct color data of the location in the targeted page to be output in the target color, based on the correction data.

According to another aspect of the present invention, there is provided an image processing method comprising: an input step of inputting a plurality of pages worth of image data; a designating step of designating a color to be output in a target color; an analyzing step of extracting, with regard to the image data input in the input step, coordinates of a location to be output in the target color designated in the designating step, and page information that specifies a page that includes the coordinates; a colorimetry step of measuring a color of an image that is on a page prior to a page with respect to which the color to be output in the target color was designated, and that was obtained by forming an image based on data including the color designated in the designating step; a correction data generating step of generating correction data for approximating a color resulting from the colorimetry to the target color; and a correcting step of correcting color data of the location in the targeted page to be output in the target color.

According to the present invention, an image processing apparatus and an image processing method capable of securing color reproduction accuracy of specific colors, despite fluctuations in the output characteristics in an image output apparatus using an electrophotographic method, can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, a best mode for carrying out the present invention will be described with reference to the drawings. Note that in the present invention, an example using a color printer will be described, but the present invention is not limited to image processing by a color printer, and can be applied to image processing by an arbitrary multifunctional peripheral or the like, within a scope that does not depart from the gist thereof.

Figure 1:
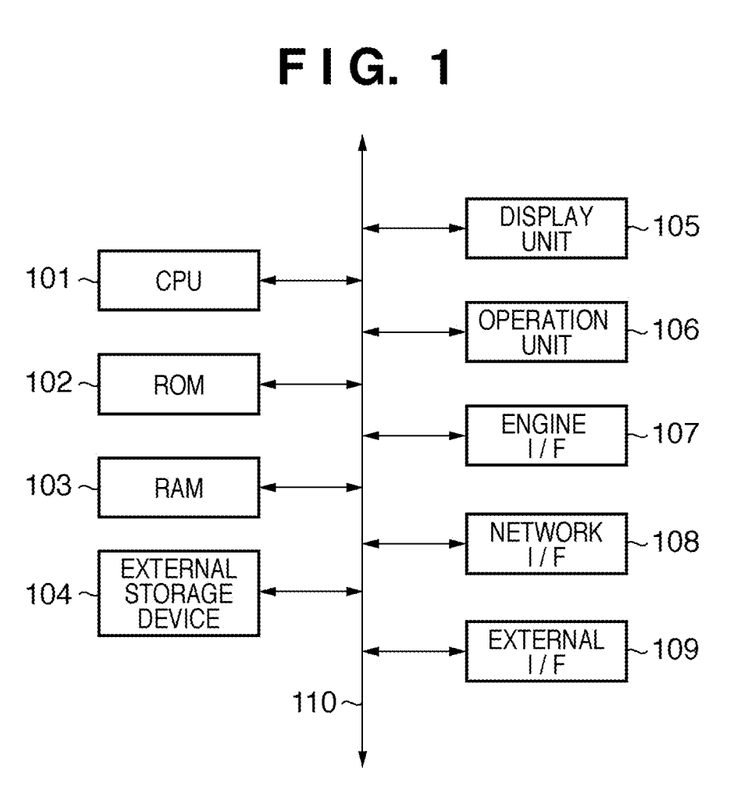
FIG. 1 is a block diagram showing the configuration of a printer controller of a color printer according to an embodiment of the present invention.

FIG. 1 is a block diagram showing the configuration of a printer controller of a color printer according to an embodiment of the present invention. The system is provided with a CPU 101, a ROM 102, a RAM 103, an external storage device 104, a display unit 105, an operation unit 106, an engine I/F (interface) 107, a network I/F 108, an external I/F 109, and a system bus 110.

The CPU 101 is a central processing unit for performing control of the entire apparatus, arithmetic processing and the like, and executes various types of processing (described below) based on programs stored in the ROM 102. The ROM 102 is a read-only memory, and is a storage area for a system startup program and a program for controlling a printer engine. The RAM 103 is a random access memory, and programs and data are loaded thereon and executed for each of the various types of processing. The RAM 103 can also be used as a data storage area for received image data. The external storage device 104 is constituted by a hard disk and the like, for example, spools data, stores programs, various image data, data used when image processing is performed, and the like, and is used as a work area. The display unit 105 is for performing display using liquid crystals or the like, for example, and is used for displaying the set state of the apparatus, current processing in the apparatus, error states, and the like. The operation unit 106 is used for changing and resetting settings, and can also display an operation screen for designating a color value (described below), together with the display unit 105. The engine I/F 107 is the unit that actually handles printer engine control, measurement data, and the like. The network I/F 108 is for connecting the apparatus to a network via the network I/F 108. The external I/F 109 is connected to an external device via a parallel (or a serial) interface. The system bus 110 is for providing a data path between the abovementioned constituent elements.

Figure 2:
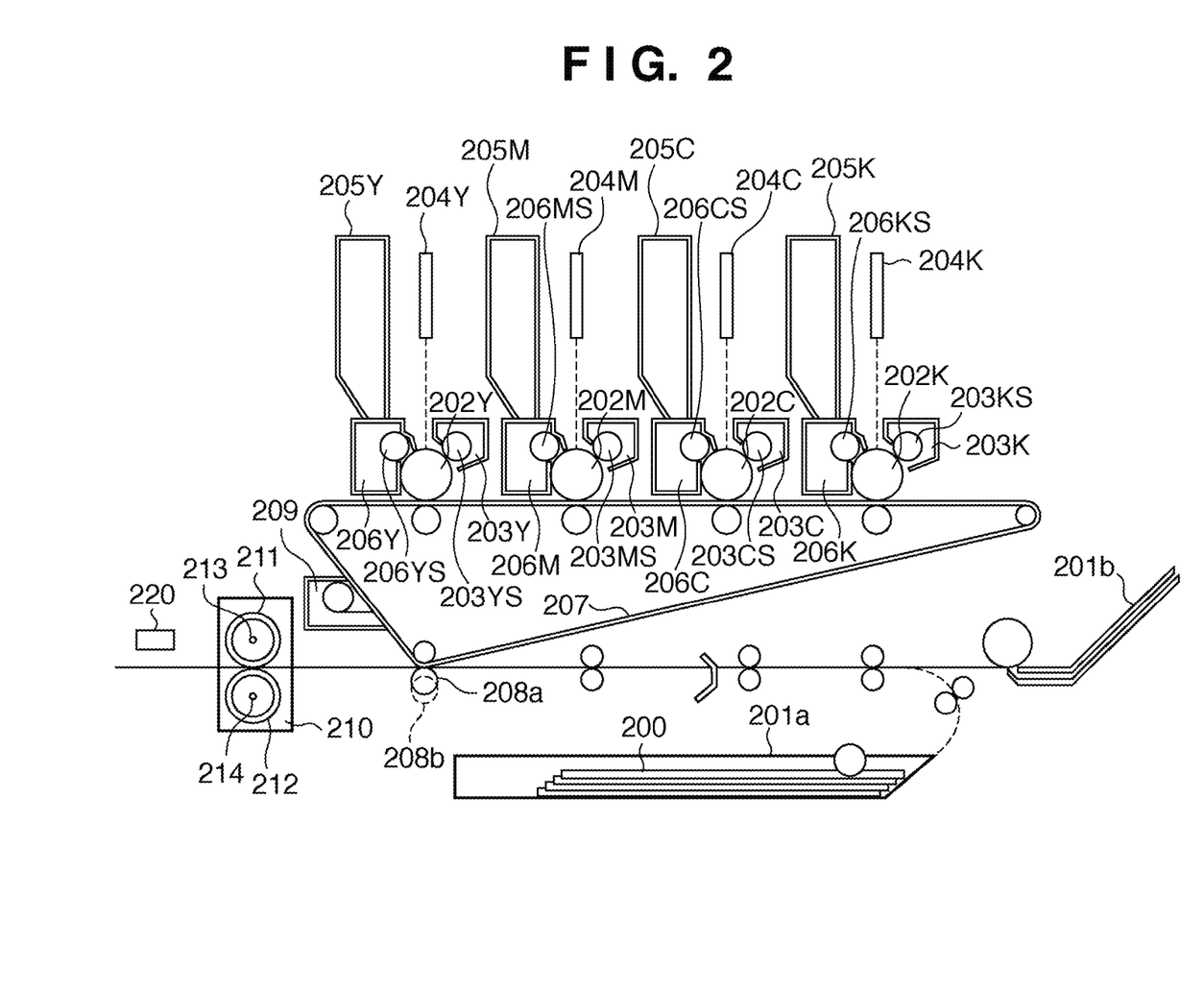
FIG. 2 is a cross-sectional view showing a printer engine of the color printer.

FIG. 2 is a cross-sectional view showing the printer engine of the color printer. In this example, the printer engine will be described as being an electrophotographic printer engine that uses a tandem system employing an intermediate transfer member. Note that the characters Y, M, C and K in reference numerals denote functional units corresponding respectively to the developing colors yellow, magenta, cyan and black. Also, hereinafter, recording material used in the electrophotographic method will be called transfer material. The printer engine is constituted by paper feeding units (201a, 201b), photoconductive drums (202Y, 202M, 202C, 202K), injection charging units (203Y, 203M, 203C, 203K) serving as primary charging units, scanner units (204Y, 204M, 204C, 204K), toner cartridges (205Y, 205M, 205C, 205K), developing units (206Y, 206M, 206C, 206K), an intermediate transfer member 207, a transfer roller 208, a cleaning unit 209, a fixing unit 210, and a color sensor 220. Also, sleeves (203YS, 203MS, 203CS, 203KS) and sleeves (206YS, 206MS, 206CS, 206KS) are respectively provided in the injection charging units and the developing units. Note that the developing units (206Y, 206M, 206C, 206K) are attached in a removable state.

The surfaces of the photoconductive drums (202Y, 202M, 202C, 202K) are selectively exposed and electrostatic latent images are formed, as a result of exposure from the scanner units (204Y, 204M, 204C, 204K) based on image data input from the engine I/F 107.

The electrostatic latent images on the surfaces of the photoconductive drums (202Y, 202M, 202C, 202K) are developed by the developing units (206Y, 206M, 206C, 206K), and monochromatic toner images are formed. The intermediate transfer member 207 contacts the photoconductive drums (202Y, 202M, 202C, 202K), and rotatably moves in the clockwise direction with the rotation of the photoconductive drums (202Y, 202M, 202C, 202K) when image forming is performed. A multicolor toner image is formed by superimposing the yellow, magenta, cyan and black monochromatic toner images on the intermediate transfer member 207. Note that the photoconductive drums (202Y, 202M, 202C, 202K) have an organic photoconductive layer applied to the outer circumference of an aluminum cylinder, and rotate in the counterclockwise direction when the driving force of a drive motor (not shown) is conveyed in response to an image forming operation.

Subsequently, the intermediate transfer member 207 and the transfer roller 208 come into contact to hold between and convey a transfer material 200, and the multicolor toner image on the intermediate transfer member 207 is transferred to the transfer material 200. Note that the transfer roller 208 contacts the transfer material 200 at a position 208a while the multicolor toner image is being transferred to the transfer material 200, and separates to a position 208b after the printing process.

The fixing unit 210 is for fusing and fixing the multicolor toner transferred to the transfer material 200. The fixing unit 210 is provided with a fixing roller 211 that heats the transfer material 200, and a pressure roller 212 for pressure contacting the transfer material 200 on the fixing roller 211. The fixing roller 211 and the pressure roller 212 are hollow, and respectively incorporate heaters 213 and 214 therein. That is, the transfer material 200 holding the multicolor toner image is conveyed, has heat and pressured applied thereto, and toner fixed to the surface thereof by the fixing roller 211 and the pressure roller 212. The transfer material 200 with the toner image fixed thereon is subsequently discharged to a paper discharge tray (not shown) by a discharge roller (not shown) to end the image forming operation.

Note that the cleaning unit 209 is for cleaning toner remaining on the intermediate transfer member 207, after the multicolor toner image formed on the intermediate transfer member 207 has been transferred to the transfer material 200, and waste toner is accumulated in a cleaner container (not shown).

The color sensor 220 is disposed facing an image forming surface of the transfer material 200 downstream of the fixing unit 210 on the transfer material conveyance path, and detects RGB output values with respect to a fixed toner image 310 formed on the transfer material 200. Note that the color sensor 220 is disposed immediately before the paper discharge opening, and can be driven in a direction orthogonal to the conveyance direction. Accordingly, detection is possible with regard to arbitrary positions on the transfer material by driving the sensor in an orthogonal manner in time with conveyance of the transfer material.

Figure 3:
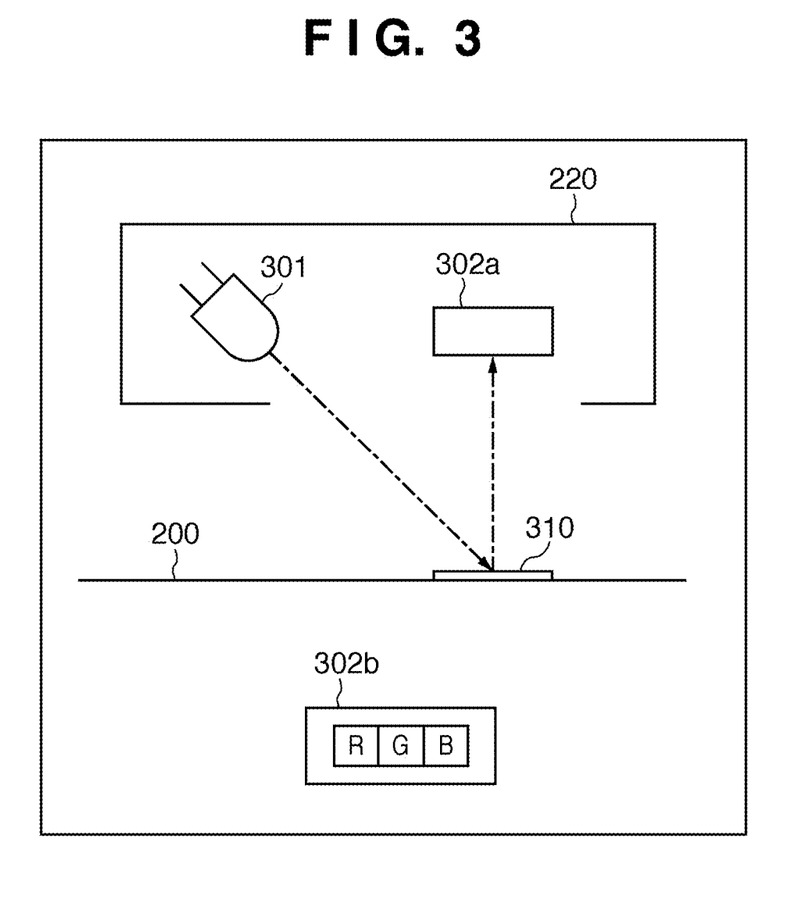
FIG. 3 shows an example of the configuration of a color sensor 220.

FIG. 3 shows an example of the configuration of the color sensor 220. The color sensor 220 has a white LED 301 and an RGB on-chip filter sensor 302a, for example. The color sensor 220 causes the white LED 301 to be incident at an angle of 45 degrees with respect the transfer material 200 on which the fixed toner image 310 is formed, and detects the intensity of diffuse light in a 0 degree direction (i.e., direction perpendicular to surface of transfer material) using the RGB on-chip filter sensor 302a. A light-receiving unit of the RGB on-chip filter sensor 302a consists of separate RGB pixels such as 302b.

Note that the RGB on-chip filter sensor 302a may use photodiodes, or a sensor arranged with plural sets of three RGB pixels may be used. The RGB on-chip filter sensor 302a may also be constituted by an LED that emits the three RGB colors and a sensor without a filter. Note that the angle of incidence and the angle of reflection can be freely set within a range in which diffused light can be detected on the transfer material 200, in order to detect diffuse light.

Figure 4:
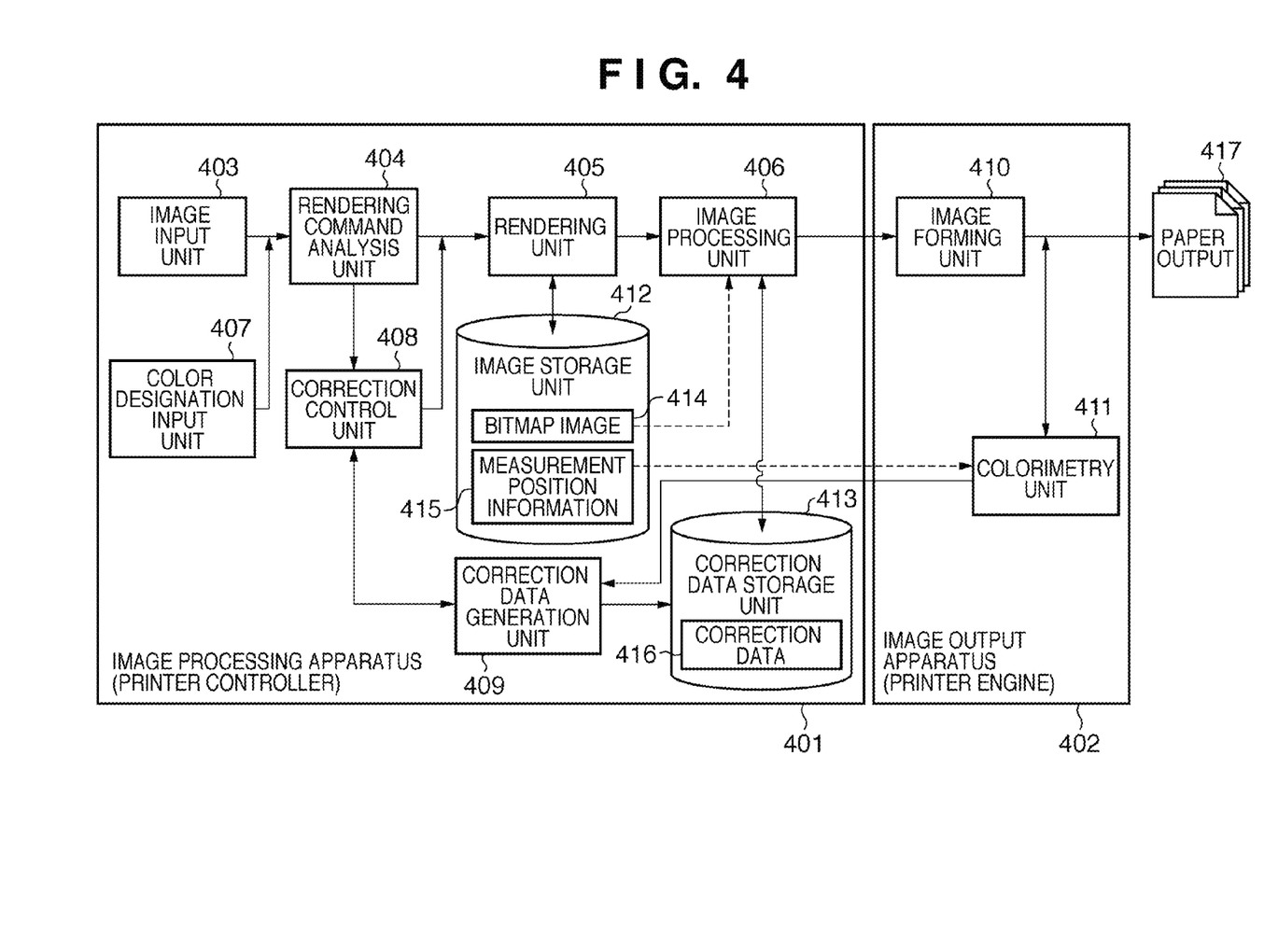
FIG. 4 is a block diagram showing a functional configuration of an image processing apparatus 401.

FIG. 4 is a block diagram showing a functional configuration of an image processing apparatus 401. The image processing apparatus 401 is assumed, in the present embodiment, to be a printer controller. An image output apparatus 402 is assumed, in the present embodiment, to be a printer engine, and has an image forming unit 410 that forms an image on a recording medium in page units, and a colorimetry unit 411 that is positioned downstream of the image forming unit 410, and measures the color of a designated position on the recording medium that has undergone image forming.

The image processing apparatus 401 is provided with an image input unit 403, a rendering command analysis unit 404, a rendering unit 405, an image processing unit 406 (correcting unit), a color designation input unit 407, a correction control unit 408 (first determining unit, second determining unit), a correction data generation unit 409, an image storage unit 412 and a correction data storage unit 413.

The image input unit 403 inputs a plurality of pages worth of image data. The image input unit 403 can receive image data transmitted from an information processing apparatus (host PC; not shown) via the network I/F 108, for example.

Here, transmitted image data is in the format of a rendering command, which, in the present embodiment, is a PDL (Page Description Language) for generating page image data. Rendering commands normally include print settings relating to the number of print copies, the page layout, and the print order as control commands, together with the rendering commands of image data that include the attribute information of an image, graphics, text or the like.

The color designation input unit 407 is for designating, as a target color, a color value to be reproduced with particularly high accuracy in image data to be printed. Note that the designation of a color value may be performed with respect to a single color or a plurality of colors. A color value to be recreated using a target color designated by the color designation input unit 407 is called a designated color. Input of a designated color can be performed with a panel UI composed of the display unit 105 and the operation unit 106, or the like. Also, the color designation input unit 407 can also receive a designated color as a control command together with image data transmitted from a host PC. As a method of designating color values, colors to be reproduced that are defined using a color chart such as PANTONE color or DIC color, or RGB values that correspond in advance with color values in a uniform color space (e.g., L*a*b* colorimetric system) may be designated.

Image data received by the image input unit 403 is analyzed in the rendering command analysis unit 404, and a rendering object which is an intermediate language that can be processed by the rendering unit 405 is generated. On the other hand, the rendering command analysis unit 404 analyzes which designated colors are used where in the image data, with regard to designated colors input in the color designation input unit 407, and derives designated color position (coordinate) information. Designated color position information includes information relating to the print page and the on-page position at which the designated colors are to be printed, based on print settings such as the number of print copies and the page layout.

Designated color position information extracted by the rendering command analysis unit 404 is input to the correction control unit 408. The correction control unit 408, in order to improve the reproduction accuracy of a designated color to be output, performs control such that optimum correction data is applied to the designated color in the image processing unit 406 (discussed below). Specifically, the correction control unit 408 generates colorimetry information necessary for the correction process, and adds position information for performing colorimetry to attribute information of as image, graphics, text or the like with respect to the rendering object generated in the rendering command analysis unit 404. Further, the correction control unit 408 newly generates a rendering object by generating patch data necessary for performing measurement as required. Note that the detailed processing by the correction control unit 408 will be discussed later.

The rendering unit 405 generates a bitmap image 414 and measurement position information 415, by executing a rendering process on the rendering objects generated by the rendering command analysis unit 404 and the correction control unit 408.

The bitmap image 414 generated by the rendering process undergoes image processing such as color conversion, density correction and halftone processing by the image processing unit 406, and is converted to a print image format that can be output by the image forming unit 410.

Figure 5:
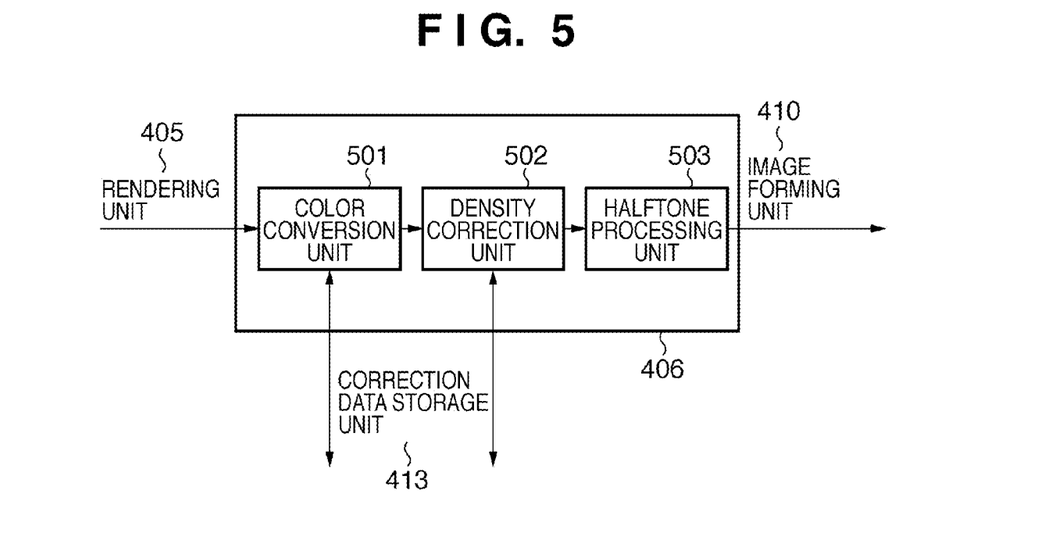
FIG. 5 is a block diagram showing a functional configuration of an image processing unit 406.

FIG. 5 is a block diagram showing a functional configuration of the image processing unit 406. The case where the input from the image processing unit 406 to the image forming unit 410 is image data corresponding to toner of the four CMYK colors, and the bitmap image 414 is RGB color space image data is assumed. In this case, a color conversion unit 501 performs a conversion process of converting the bitmap image 414 to CMYK color space image data. Also, a density correction unit 502 performs a density correction process on the converted CMYK image data. The image forming unit 410 is often normally only able to output low number of gray levels such as 2, 4 or 16 gray levels. Accordingly, a halftone processing unit 503 performs halftone processing such as to enable stable halftone representation even in an image forming unit 410 that can only output a few gray levels.

Note that the image processing unit 406 performs color conversion and density correction, based on correction data 416 held in the correction data storage unit 413. The correction data used here may be used in conjunction with density correction data or the like generated using a conventional method, together with correction data generated by the correction data generation unit 409 (discussed later).

The printing process is performed as a result of print image data generated as a result of a bitmap image being converted to a predetermined image format by the image processing unit 406 being transmitted to the image forming unit 410 as a video signal via the engine I/F 107. That is, printing to paper serving as the transfer material is completed by passing through the processes of exposure, developing, transfer and fixing.

Note that an output buffer for temporarily holding video signals to be transferred to the printer engine, and an output buffer for temporarily holding signals sent from the printer engine are provided in the engine I/F 107. Communication control with the printer engine is thereby performed, together with constituting an input/output unit for signals exchanged with the printer engine.

On the other hand, when performing the printing process, the colorimetry unit 411 performs a measurement process on printed material using the color sensor 220, based on the measurement position information 415 generated by the rendering unit 405. In the present embodiment, the color sensor is assumed to detect RGB output, and measurement ends as a result of the measurement values being converted to values in a uniform color space, such as values in L*a*b* color space, taking into account the characteristics of the color sensor.

The measurement values acquired by the color sensor and converted to L*a*b* color space data are input to the correction data generation unit 409 via the engine I/F 107. The correction data generation unit 409 acquires a Lab value of a designated color designated as a target color that was originally to be reproduced from the correction control unit 408, compares the acquired Lab value with the measured Lab value, and updates the correction data based on the correction data 416 held in the correction data storage unit 413. Note that the data update method will be discussed in detail later. High accuracy reproduction is enabled in relation to a designated color as result of applying the correction data thus updated to processing of the designated color by the image processing unit 406.

That is, the correction control unit 408, when image data of a targeted page input by the image input unit 403 is formed by the image forming unit 410, functions as a first determining unit that determines whether the targeted page has a location to be output in the target color, based on the designated color position information extracted by the rendering command analysis unit 404.

Also, the correction control unit 408, in the case where it is judged by the first determining unit that the targeted page does have a location to be output in the target color, functions as a second determining unit that determines whether a page prior to the targeted page has a location to be output in the target color.

The correction data generation unit 409, in the case where it is determined by the second determining unit that a page prior to the targeted page has a location to be output in the target color, generates correction data for approximating a color that results from colorimetry performed on the location of that page by the colorimetry unit 411 to the target color. The image processing unit 406 corrects the color data of the location in the targeted page to be output in the target color determined by the first determining unit, based on the correction data.

Figure 6:
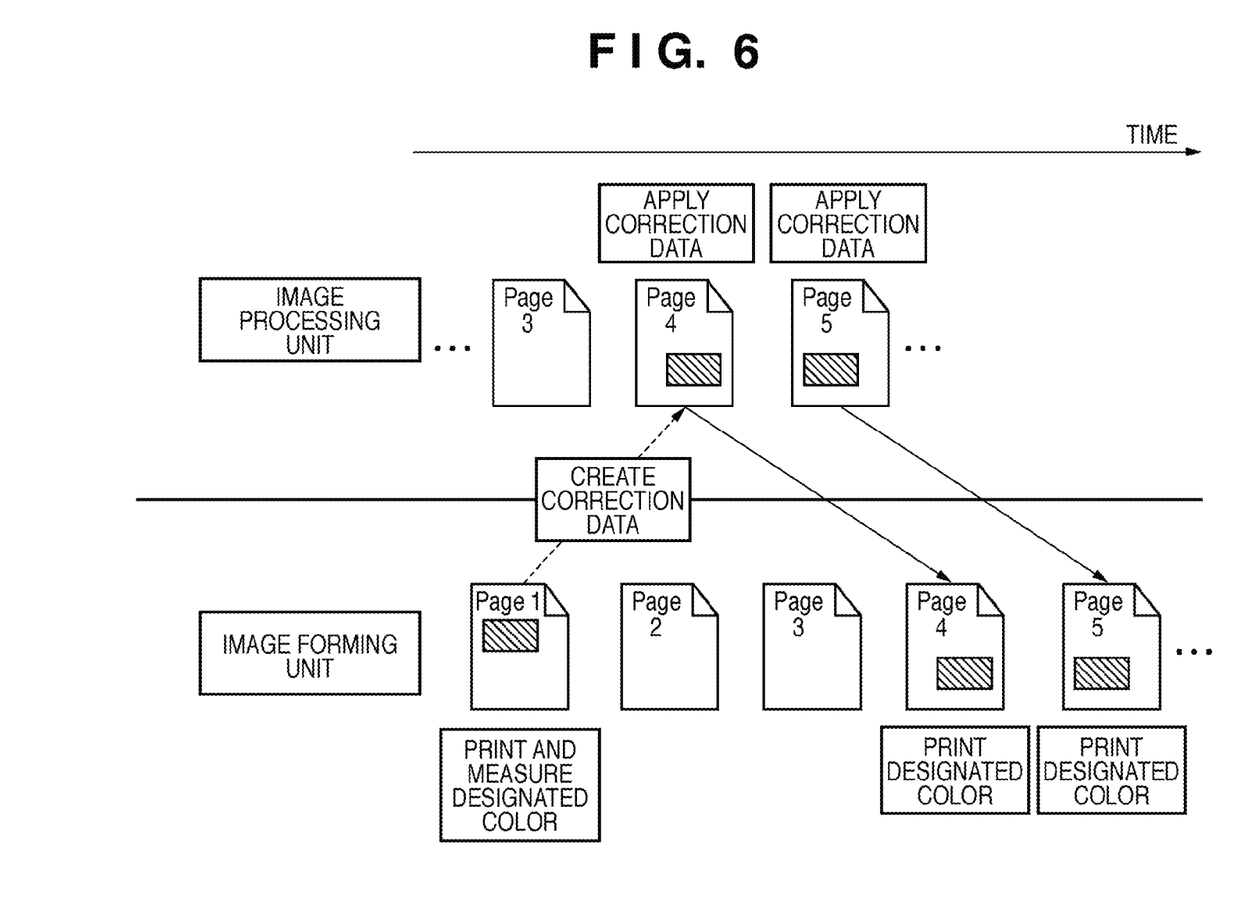
FIG. 6 shows an example of processing by a correction control unit 408.

FIG. 6 shows an example of processing by the correction control unit 408. In the present embodiment, control is performed such that optimum correction data is applied, when print image data that includes image data to be rendered in a designated color is generated by the image processing unit 406. Accordingly, when generating the print image data of a page that includes a designated color, correction data generated based on the result of measuring the designated color printed most recently to the print image data being generated is applied. In the print job shown in FIG. 6, rendering data to be rendered in a designated color exists in pages 1, 4 and 5. Note that the horizontal axis is a time axis. In this case, it is clearly desirable, in relation to the data of page 4 (targeted page), to apply correction data based on the result of measuring the rendering data of the designated color printed on page 1, which is prior to the targeted page. Also, in relation to page 5, the rendering data of the designated color to be printed most closely in time is page 4, but correction data based on the measurement result of page 4 cannot be used, when taking into account the time for generating correction data after measurement and the time from when processing is performed by the image processing unit to when printing is performed by the image forming unit. Accordingly, correction data based on the measurement result of page 1 will also be used in relation to page 5. The correction control unit 408 generates a control list for performing correction based on information relating to the print page and the on-page position at which the designated color extracted by the rendering command analysis unit 404 is to be printed.

Figure 7:
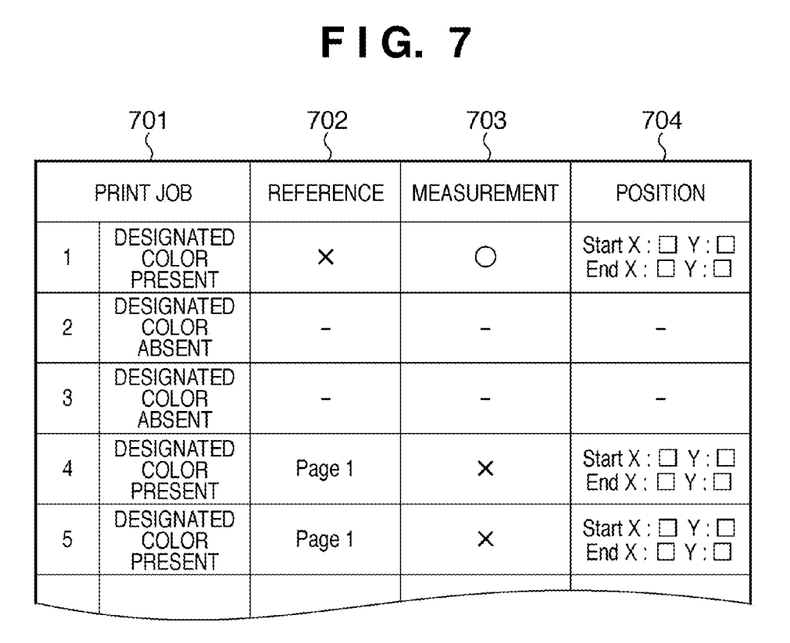
FIG. 7 shows an example of a correction control list generated by the correction control unit 408.

FIG. 7 shows an example of a correction control list generated by the correction control unit 408. This correction control list respectively includes print job information 701, reference information 702, measurement information 703 and position information 704. The print job information 701 indicates, with regard to the respective pages of the job, what designated colors are used on which pages, based on the result of analysis by the rendering command analysis unit 404. The reference information 702 indicates, in relation to pages on which the designated color is to be rendered, what correction data generated based on the measurement result of which of the pages will be used, when processing is performed by the image processing unit 406. That is, here, pages 4 and 5 use correction data generated based on the measurement result of measuring the designated color printed on page 1. Note that when a designated color is analyzed by the rendering command analysis unit 404, the layout information on the page is also extracted in addition to information on which of the pages the target color is being used with. Accordingly, rendering data that is difficult to measure with a color sensor even when rendered in a designated color, such as data in a narrow area, for example, is not designated as a reference. The measurement information 703 is information that indicates whether measurement will actually be performed in relation to a designated color on a page. That is, measurement of pages designated as references in the reference information 702 is performed. The correction control unit 408, in relation to pages on which measurement is performed, adds measurement position information indicating a measurement position to the rendering object as a new attribute, based on the position information 704.

Note that in FIGS. 6 and 7, correction data based on measurement cannot be applied, in relation to the rendering data of the designated color to be rendered in page 1. Accordingly, reproduction accuracy will not be guaranteed with respect to the rendering data of the designated color to be rendered in page 1.

In the present embodiment, in the case where there is rendering data without a reference, the above problems are responded to by generating patch data to be rendered in the designated color, and newly adding the patch data as a rendering object.

The correction control unit 408, in the case where it is judged by the first determining unit, with respect to a first page determined to have a location to be output in a target color, that a location to be output in the target color for measuring does not exist in a page prior to the first page, inserts print data that includes the designated color (to be output in the target color) for examining the output characteristics of the image output apparatus 402 prior to the targeted page (first page). Correction data is generated by performing colorimetry on the colors of the image formed by the image forming unit 410 based on the print data.

Figure 8:
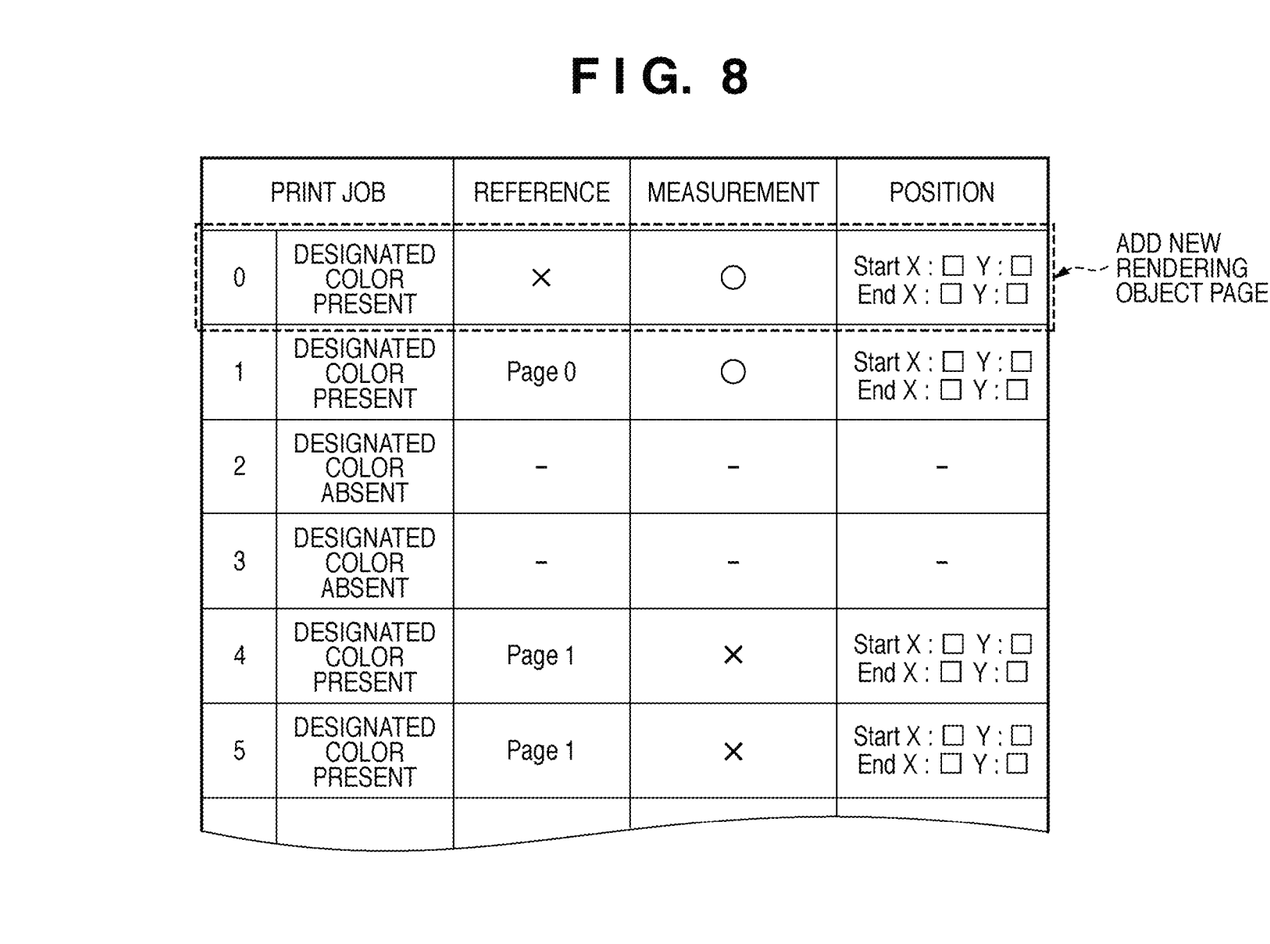
FIG. 8 shows an example of a correction control list when a rendering object has been added.

FIG. 8 shows an example of the correction control list when a rendering object has been added. A page for printing patch data is newly added, in the case where a list without a reference exists, even though the designated color is to be rendered thereon, as shown with page 1 in FIG. 8. Specifically, rendering object data having measurement position information as an attribute is newly added.

Note that provision of data as a reference is limited to the case where it is judged that the correction process using correction data generated based on the result of performing measurement on the data is effective. That is, a reference is, as abovementioned, limited to data having an area of a size that can be measured with a color sensor. Also, since an image output state of the image processing apparatus itself also fluctuates during the printing process, and image reproducibility is constantly changing, correction data also needs to be generated in as close an output state as possible. Accordingly, a reference is limited to data within a certain fixed number of pages from the page on which targeted rendering data is to be printed. In other words, if, in a print job that involves printing a large number of pages, for instance, the number of consecutive pages on which rendering data of a designated color is not printed is greater than or equal to a fixed number of pages, rendering data of the designated color that is subsequently rendered will not have a reference.

That is, the correction control unit 408 functions as a third determining unit that determines whether a page interval between a first page determined by the first determining unit to have a location to be output in the target color and a second page determined one page previous to the first page to have a location to be output in the target color is greater than a predetermined threshold. The correction control unit 408, in the case where the page interval is determined by the third determining unit to be greater than the threshold, functions as an inserting unit that inserts print data that includes the color to be output in the target color for examining the output characteristics of the image output apparatus 402 between the first page and the second page.

Figure 9:
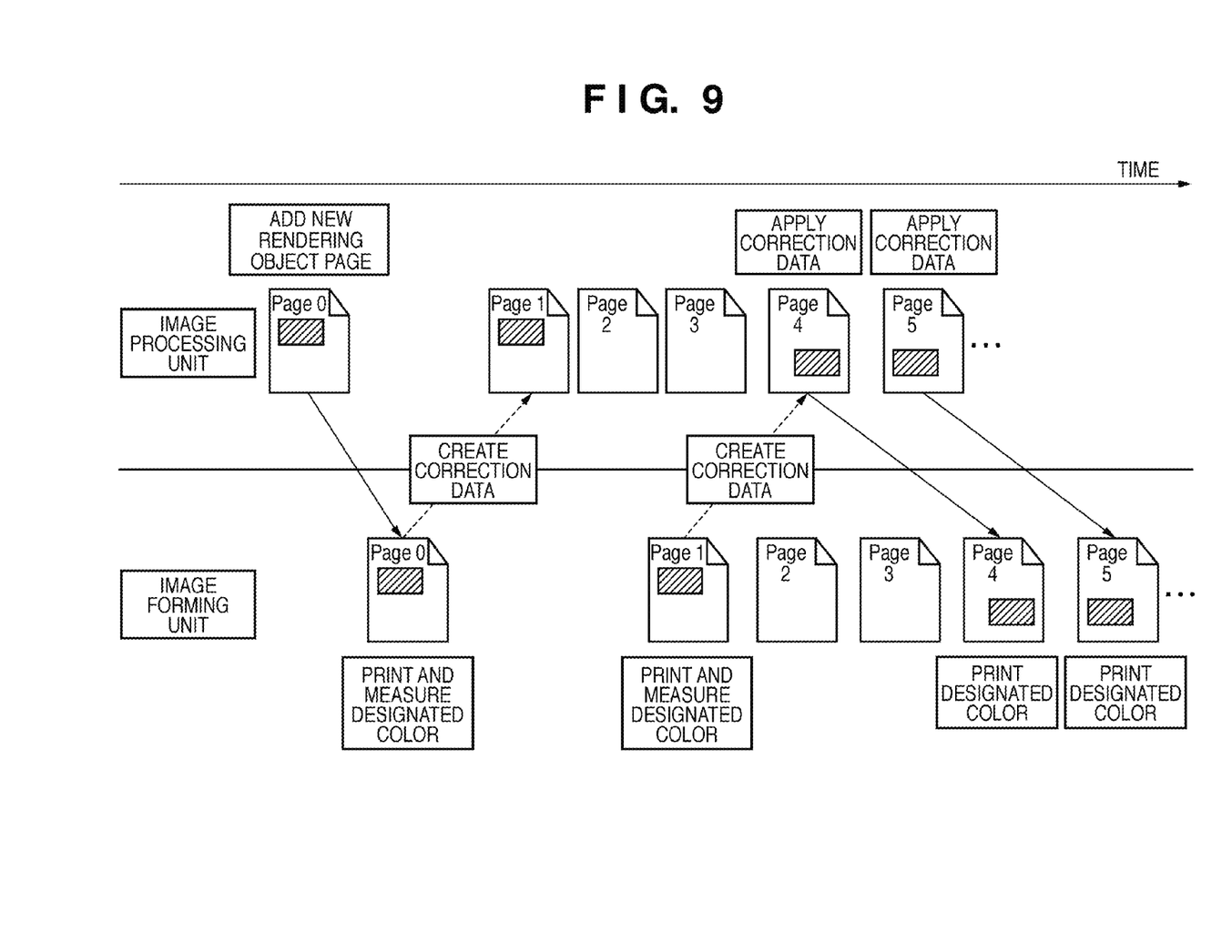
FIG. 9 shows an example of a print job when a rendering object has been added.

FIG. 9 shows an example of a print job when a rendering object has been added. That is, a print job is shown in the case of being controlled using the correction control list shown in FIG. 8. Newly adding a rendering object enables generation of correction data to be used when generating the print image data of page 1. Here, the time needs to be adjusted at page 0 and page 1, taking into account feedback to page 1. Note that, here, while an example is given in which a new rendering object is added to the very beginning of a print job, in the case where a new rendering object is added to the middle of a print job, the rendering object can be added such that downtime such as the above does not arise. In this case, the new rendering object need only be created a certain fixed number of pages prior to the page in which the targeted image data exists. Also, the page to which the rendering object is newly added will be an unwanted printed material for the user, not being included in the original print job. Accordingly, in relation to a page to which a rendering object has been newly added in order to generate correction data such as described above, the conveyance path may be separated from the normal printed material, so as to be easily removed later. In the correction data generation unit 409, color conversion data used by the color conversion unit 501 and density correction data used by the density correction unit 502 will be the correction target.

An example of a generation method for density correction data used by the density correction unit 502 will be discussed hereinafter. The correction data generation unit 409 holds profile data regarding reference printer characteristics, and specifically, holds Lab to CMYK conversion data concerning the printer.

Firstly, Ci, Mi, Yi and Ki are computed using the above profile data, from Lab values forming target values of the designated color. On the other hand, Cm, Mm, Ym and Km are computed using the above profile data, from Lab values that are measurement values. Correction data is updated as a result of revising the density correction data held in the correction data storage unit 413, by comparing these respective CMYK values.

Figure 10:
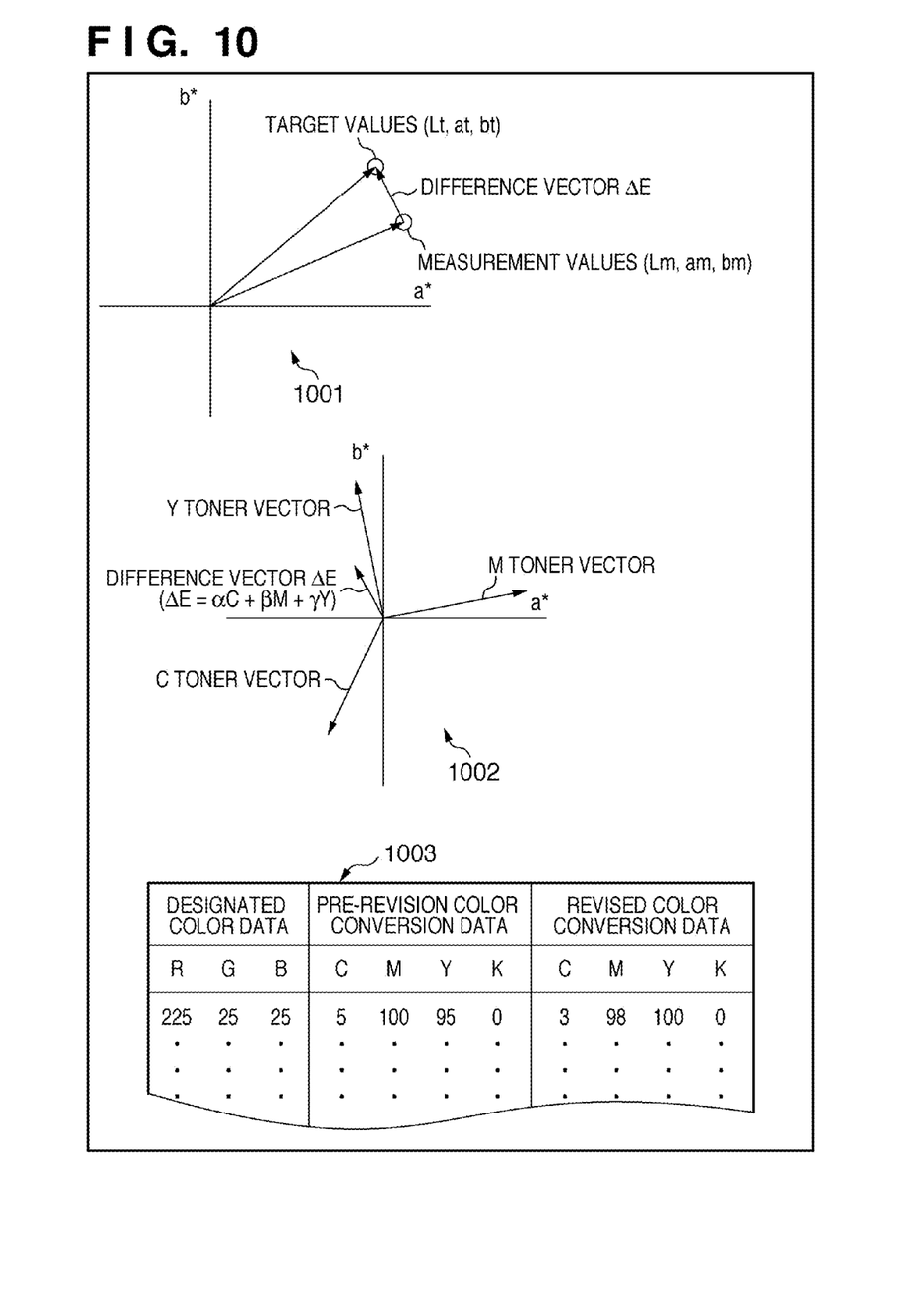
FIG. 10 shows an example of a process for changing a color conversion table.

On the other hand, an example such as the following is given, in relation to the correction of color conversion data used by the color conversion unit 501. FIG. 10 shows an example of a process of changing a color conversion table. Reference numeral 1001 denotes a surface with respect to which a uniform color space L*a*b* is projected onto a a*b* surface, and Lab values that are target values of the designated color and Lab values that are obtained by measurement are indicated by vectors. Firstly, a difference vector ΔE of the Lab values forming the target values of the designated color and the measured Lab values is derived.

Next, using a C toner vector, an M toner vector and a Y toner vector, which are respective toner characteristics of the printer, the difference vector ΔE is broken down into the above three vectors. The breakdown of the vector is given by the following equation.

$$\Delta E = \alpha C + \beta M + \gamma Y$$

Also, the state of the vector after being broken down is shown by reference numeral 1002. Correction data for RGB to CMYK conversion data can be generated by standardizing the broken down data α, β, γ obtained here. Revision of color conversion data ends as a result of color conversion data being revised as shown by reference numeral 1003 using the correction data generated here. Note that the present invention is not limited to the above two methods of generating correction data, and other methods may be applied.

Figure 11:
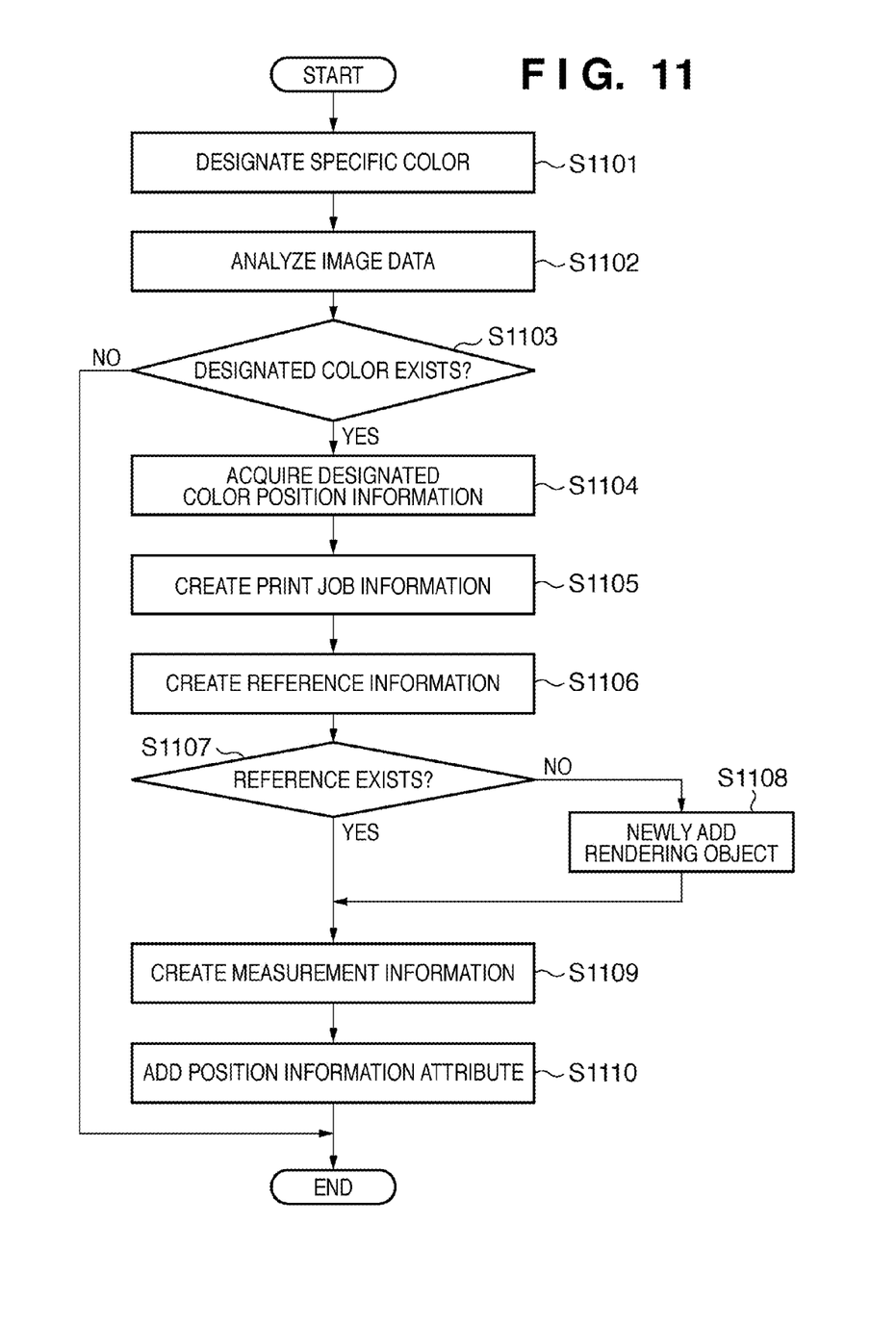
FIG. 11 shows a processing procedure of the correction control unit 408.

FIG. 11 shows a processing procedure of the correction control unit 408. The following processing is executed by the CPU 101 based on a program stored in the ROM 102. Firstly, a color value that is required to be reproduced with particularly high accuracy is designated at S1101 with respect to image data to be printed. A single color or a plurality of colors may be designated here. Note that the designated color is assumed to correspond in advance to values in a uniform color space as a target color, so as to anticipate the way in which the designated color will be reproduced.

Next, the image data is analyzed at S1102, and it is determined at S1103 whether rendering data to be rendered in the designated color exists in the image data. If rendering data to be rendered in the designated color does not exist, the correction control process is directly terminated. On the other hand, if rendering data to be rendered in the designated color does exist, information relating to the position at which the designated color is to be printed is acquired at S1104 based on print settings such as the number of print copies and the page layout. Note that the subsequent processing is also not applicable with regard to color values that are not extracted by the analysis result, even in the case of there being a plurality of designated colors.

Next, at S1105, print job information, which is an item in the control list, is generated, based on the acquired designated color position information. Next, reference information for performing measurement for generating correction data is generated at S1106, based on the generated print job information. Note that a reference is not designated with respect to the rendering data of respective designated colors, if it is judged that a result of performing colorimetry using an earlier print job cannot be obtained (i.e., first page to be printed, or rendering data area of designated color on pages prior to second page onwards is small) or if a prescribed number of pages have been printed.

If a reference is not designated, a rendering object to be rendered in the designated color is newly added at S1108 as a new page (i.e., page that includes print data for examining the output characteristics of the image output apparatus 402), and this rendering object is registered as a reference. At S1109, measurement information holding information indicating whether to perform measurement is generated in relation to respective pages based on the reference information. Finally, the correction control process is terminated, in relation to a page to be measured, as a result of a position to be measured in the page being added as position information to an attribute of the rendering object at S1110, based on the designated color position information acquired at S1104.

Note that if an error occurs due to a paper jam of the like, there is a high possibility of the image output state of the image processing apparatus itself fluctuating, and image reproducibility changing. For this reason, when error processing or the like is performed, the control list is recreated again from image data being printed.

Figure 12:
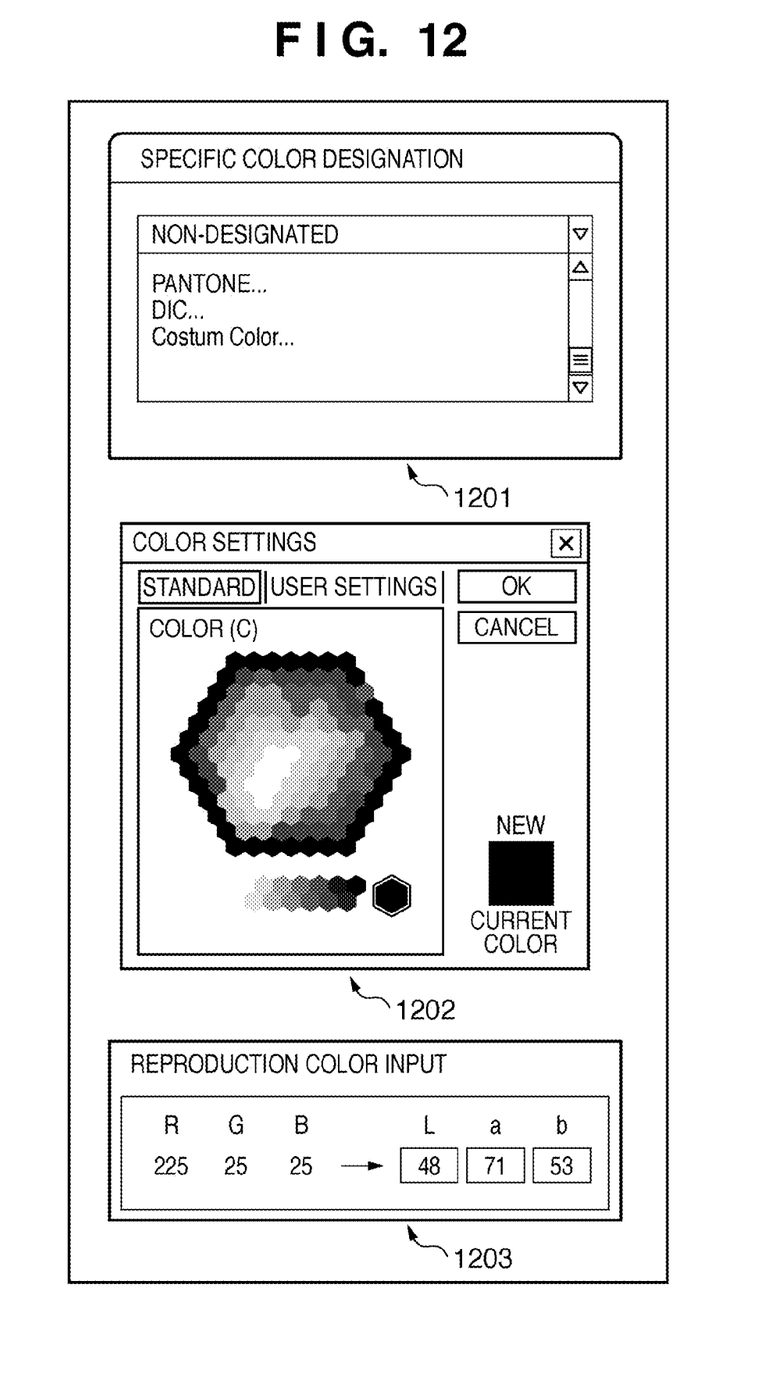
FIG. 12 shows an example of a designation procedure for a specific color.

FIG. 12 shows an example of a designation procedure for a designated color. Reference numeral 1201 is an operation screen of a host PC assuming the case where a designated color is designated as a control command, when image data is transmitted from the host PC. A designated color can be designated by designating a color value from defined Lab values such as PANTONE color and DIC color.

On the other hand, reference numerals 1202 and 1203 show examples in which target Lab values are defined with respect to given RGB values. In 1202, firstly, color values, that is, RGB values, that can be set in the host PC are designated as designated colors. Next, Lab values forming target colors for reproduction are input with respect to the designated RGB value as in 1203. Colors for which particularly high accuracy is desired can be designated by transmitting the Lab values to the image processing apparatus as designated colors, with these data as control commands.

As abovementioned, according to the present embodiment, the color reproduction accuracy of designated colors can be raised without complicating the operations, by designating a specific color for which adjustment to a target color with high accuracy is required for each print job, extracting an area in the job to be printed in the designated specific color, and measuring the extracted area with a sensor positioned after the fixing process, together appropriately performing feedback based on measurement values to reproducing the specific color.

Note that the processing described in the present embodiment may be applied to a system constituted by a plurality of devices (e.g., host computer, interface device, reader, printer, etc.), or an apparatus (e.g., copier, facsimile machine, etc.) composed of a single device.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-057129, filed Mar. 10, 2009, which is hereby incorporated by reference herein in its entirety.

What is claimed is:

1. An image processing apparatus comprising:
an input unit configured to acquire first image data which is input;
an output unit configured to output both the first image data and second image data including at least a patch of an original pre-correction color used in the first image data;
a colorimetry unit configured to measure a color of the patch output by the output unit;

a generation unit configured to generate correction data for approximating a color resulting from the colorimetry to a target color; and a correction unit configured to correct the first image data based on the correction data generated by the generation unit, wherein the output unit is further configured to output the first image data after the correction unit corrects color of the first image data based on the correction data generated by the generation unit.

2. The image processing apparatus according to claim 1, wherein the patch includes a plurality of colors.

3. The image processing apparatus according to claim 1, wherein the at least one color is a PANTONE color or a DIC color.

4. The image processing apparatus according to claim 1, wherein the image data is PDL data.

5. The image processing apparatus according to claim 1, wherein the at least one color is displayed at an apparatus which sends the image data to the image processing apparatus.

6. The image processing apparatus according to claim 1, wherein the at least one color is represented by a combination of three colors.

7. The image processing apparatus according to claim 1, further comprising a pattern generation unit configured to generate the second image data of a test print page including at least the patch of the color used in the first image data, wherein the output unit is further configured to output the test print page, and the test print page is different from the first image data.

8. An image processing method comprising:
an input step of acquiring first image data which is input;
an output step of outputting both the first image data and second image data including at least a patch of an original pre-correction color used in the first image data;
a colorimetry step of measuring a color of the patch output in the output step;
a generation step of generating correction data for approximating a color resulting from the colorimetry to a target color;
a correction step of correcting the first image data based on the correction data generated in the generation step; and
an output step of outputting the first image data after the correction step corrects color of the first image data based on the correction data generated in the generation step.

9. A non-transitory computer-readable storage medium storing a program thereon, wherein the program instructs a computer to perform:
an input step of acquiring first image data which is input;
an output step of outputting both the first image data and second image data including at least a patch of an original pre-correction color used in the first image data;
a colorimetry step of acquiring a measurement of a color of the patch output in the output step;
a generation step of generating correction data for approximating a color resulting from the colorimetry to a target color;
a correction step of correcting the first image data based on the correction data generated in the generation step; and
an output step of outputting the first image data after the correction step corrects color of the first image data based on the correction data generated in the generation step.

10. The image processing apparatus according to claim 7, wherein the pattern generation unit is further configured to select a color from a plurality of colors used in the first image data as the color of the patch in the test print page.

* * * * *